(12) United States Patent
Jiang et al.

(10) Patent No.: US 9,353,305 B1
(45) Date of Patent: May 31, 2016

(54) RESERVOIR PROTECTING AGENT COMPOSITION, DRILLING FLUID FOR MIDDLE PERMEABILITY RESERVOIRS AND USE THEREOF

(71) Applicant: China University of Petroleum (Beijing), Beijing-Changping District (CN)

(72) Inventors: Guancheng Jiang, Beijing (CN); Yang Xuan, Beijing (CN); Xi Wang, Beijing (CN); Yuxiu An, Beijing (CN)

(73) Assignee: China University of Petroleum (Beijing) (CN)

( * ) Notice: Subject to any disclaimer, the term of this patent is extended or adjusted under 35 U.S.C. 154(b) by 0 days.

(21) Appl. No.: 14/878,778

(22) Filed: Oct. 8, 2015

(30) Foreign Application Priority Data

Feb. 11, 2015 (CN) .......................... 2015 1 0073629

(51) Int. Cl.
*C09K 8/12* (2006.01)
*E21B 21/00* (2006.01)

(52) U.S. Cl.
CPC .................. *C09K 8/12* (2013.01); *E21B 21/003* (2013.01)

(58) Field of Classification Search
None
See application file for complete search history.

(56) References Cited

U.S. PATENT DOCUMENTS

| | | | | | |
|---|---|---|---|---|---|
| 4,486,316 | A | * | 12/1984 | Carriere | C09K 8/24 507/119 |
| 4,806,164 | A | * | 2/1989 | Brothers | C04B 24/20 166/285 |
| 4,959,432 | A | * | 9/1990 | Fan | C08F 220/34 526/287 |
| 5,039,433 | A | * | 8/1991 | Sopko | C08F 120/58 507/121 |
| 5,502,030 | A | * | 3/1996 | Patel | C09K 8/06 507/120 |
| 6,196,317 | B1 | * | 3/2001 | Hardy | C09K 8/512 166/270 |
| 2006/0166833 | A1 | * | 7/2006 | Huber | C09K 8/035 507/126 |
| 2010/0305007 | A1 | | 12/2010 | Spindler et al. | |
| 2012/0283147 | A1 | * | 11/2012 | Vijn | C09K 8/524 507/90 |
| 2013/0324443 | A1 | * | 12/2013 | Wang | C04B 24/163 507/121 |
| 2014/0315763 | A1 | * | 10/2014 | Kakadjian | C09K 8/035 507/115 |
| 2014/0336085 | A1 | * | 11/2014 | Bishop | C09K 8/035 507/126 |

FOREIGN PATENT DOCUMENTS

| | | |
|---|---|---|
| CN | 101747880 A | 6/2010 |
| CN | 102851011 A | 1/2013 |
| CN | 103602323 A | 2/2014 |

OTHER PUBLICATIONS

First Office Action, Including Search Report, from Chinese Application No. 201510073629.3 dated Aug. 10, 2015.
Observation Filed in Response to the Office Action dated Aug. 10, 2015 from Chinese Application No. 201510073629.3.
Notification of Grant of Patent Right for Invention for Chinese Patent Application No. 201510073629.3, including allowed claims, dated Jan. 22, 2016.

* cited by examiner

*Primary Examiner* — Alicia Bland
(74) *Attorney, Agent, or Firm* — Calfee, Halter & Griswold LLP

(57) ABSTRACT

The present subject matter discloses a reservoir protecting agent composition, consisting of non-fluorescent sulfonated asphalt and a reservoir protecting agent, wherein, the reservoir protecting agent is composed of structural units denoted by the following formula (1), (2), and (3). The present subject matter further provides a drilling fluid that contains the above-mentioned reservoir protecting agent composition for middle permeability reservoirs. The present subject matter further provides an application of the drilling fluid for middle permeability reservoirs in well drilling in middle permeability reservoirs. The drilling fluid for middle permeability reservoirs disclosed in the present subject matter exhibits favorable rheology property, temperature tolerance property, and anti-collapse and protection performance when it is used in wall drilling in middle permeability reservoirs.

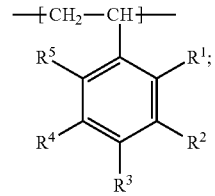

formula (1)

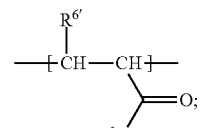

formula (2)

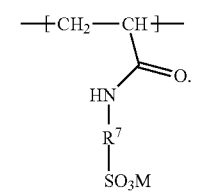

formula (3)

13 Claims, No Drawings

RESERVOIR PROTECTING AGENT COMPOSITION, DRILLING FLUID FOR MIDDLE PERMEABILITY RESERVOIRS AND USE THEREOF

CROSS REFERENCE TO RELATED APPLICATIONS

This application claims priority to Chinese Patent Application No. 201510073629.3 filed on Feb. 11, 2015 and entitled "RESERVOIR PROTECTING AGENT COMPOSITION, DRILLING FLUID FOR MIDDLE PERMEABILITY RESERVOIRS AND APPLICATION THEREOF", the entire content of which is fully incorporated here by reference.

FIELD OF THE INVENTION

The present subject matter relates to a reservoir protecting agent composition, a drilling fluid for middle permeability reservoirs and use thereof.

BACKGROUND OF THE INVENTION

Drilling fluids are reputed as the blood for bore wells. Good drilling fluid techniques are one of the important guarantees for safe, high-quality, efficient, and quick well drilling production. Drilling fluids are required in the development of oil fields.

Effective reservoir protection is an effective guarantee for improving the rate of oil and gas recovery, so that the skin factor can be an optimal negative value. If the drilling fluid is designed or used inappropriately in the well drilling process, the liquid and solid in the drilling fluid may intrude into the oil reservoir and have physical and chemical reactions with clay and other minerals in the oil and gas layer. Consequently, the permeability in the oil layer in the immediate vicinity of the well may be decreased severely, and the resistance against air and gas flow towards the bottom of the well may be increased, resulting in reduced oil yield.

Usually, the permeability of middle permeability reservoirs is 70-200 mD. Since the permeability of middle permeability reservoirs is not as low as that of low-permeability reservoirs and is not as high as that of high-permeability or super-high-permeability reservoirs, drilling fluids that are designed for low-permeability, high-permeability, or super-high-permeability reservoirs may not be suitable for protection of such middle permeability reservoirs. Middle permeability reservoirs are also confronted with damages in many aspects, for example, blockage resulted from the solid particles carried by the drilling fluid and particles produced in the drilling process, reservoir damages resulted from hydrated expansion, dispersion and migration of clay minerals; the intrusion of the working filtrate (e.g., drilling fluid) into the reservoir may result in damages such as clay swelling, dispersion and migration, and water blocking, and have impacts on the accuracy of well logging; especially, it will be more difficult to drain off the drilling fluid if the foreign fluid in the drilling fluid has physical and chemical actions with the reservoir fluid or reservoir rock; consequently, the oil and gas resources in the reservoir may be contaminated.

It is proven in field tests that the above problem can't be solved by conventional drilling fluid systems. Hence, it is especially important to develop new drilling fluid additives and reservoir protective drilling fluid techniques to meet the current challenge of complex geological conditions. Up to now, though long-time researches on reservoir protective drilling fluid techniques have been made in China and foreign countries, and techniques such as shielded temporary plugging technique, fractal geometry-based temporary plugging technique, $D_{90}$ ideal temporary plugging technique, broad-spectrum temporary plugging technique, Alkali soluble micrometer-level cellulose temporary plugging technique, $D_{50}$ temporary plugging technique, filming technique, oil film technique, etc., have been developed, the protective effect of these techniques is not ideal for middle permeability reservoirs. Hence, it is urgent task to develop a novel drilling fluid system that has enhanced plugging performance and is suitable for middle permeability reservoirs.

The existing drilling fluids have properties that can essentially meet the requirement for cuttings carrying and well wall stability, but don't provide an ideal reservoir protection effect, and the core permeability recovery value of the reservoir is low. Though temporary plugging agents are added in these drilling fluids, the plugging performance is not high because the structural characteristics of middle permeability reservoirs are not taken into consideration fully. Consequently, the filtrate may intrude into the reservoir and thereby results in damages such as water sensitivity and water blocking, etc.

SUMMARY OF THE INVENTION

To overcome the above-mentioned drawbacks in existing drilling fluids for middle permeability reservoirs in the prior art, the present subject matter provides a reservoir protecting agent composition and a drilling fluid for middle permeability reservoirs, which are especially ideal for middle permeability reservoirs and have high reservoir protection performance. The present subject matter further provides an application of the drilling fluid in well drilling in middle permeability reservoirs.

To attain the objects described above, the present subject matter provides a reservoir protecting agent composition, consisting of non-fluorescent sulfonated asphalt and a reservoir protecting agent, wherein, the reservoir protecting agent is composed of structural units denoted by the following formula (1), (2), and (3):

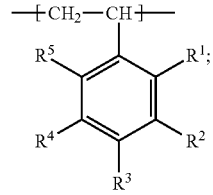

formula (1)

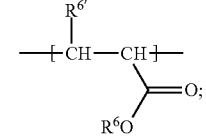

formula (2)

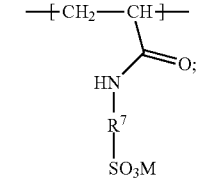

formula (3)

where, $R^1$, $R^2$, $R^3$, $R^4$, and $R^5$ independently are H, $C_1$-$C_4$ alkyl or $C_1$-$C_4$ alkoxyl; $R^6$ is $C_1$-$C_6$ alkyl; $R^{6'}$ is H or $C_1$-$C_4$ alkyl; $R^7$ is $C_1$-$C_{10}$ alkyl; M is H or an alkali metal; the molar ratio of the structural units denoted by formula (1):the structural units denoted by formula (2):the structural units denoted by formula (3) is 1:0.3-1.5:0.3-1; the weight-average molecular weight of the protecting agent is 60,000-70,000 g/mol.

The present subject matter further provides a drilling fluid that contains the above-mentioned reservoir protecting agent composition for middle permeability reservoirs.

The present subject matter further provides a use of the above-mentioned drilling fluid for well drilling in middle permeability reservoirs.

When the drilling fluid containing the reservoir protecting agent composition according to the present subject matter is used in well drilling in middle permeability reservoirs, it exhibits favorable rheology property, temperature tolerance property, anti-collapse and protection performance.

Other aspects and advantages of the present subject matter will be further detailed in the embodiments hereunder.

DETAILED DESCRIPTION

Hereunder some embodiments of the present subject matter will be detailed. It should be appreciated that the embodiments described here are only provided to describe and explain the present subject matter, but shall not be deemed as constituting any limitation to the present subject matter.

The present subject matter provides a reservoir protecting agent composition, consisting of non-fluorescent sulfonated asphalt and a reservoir protecting agent, wherein, the reservoir protecting agent is composed of structural units denoted by formula (1), formula (2), and formula (3):

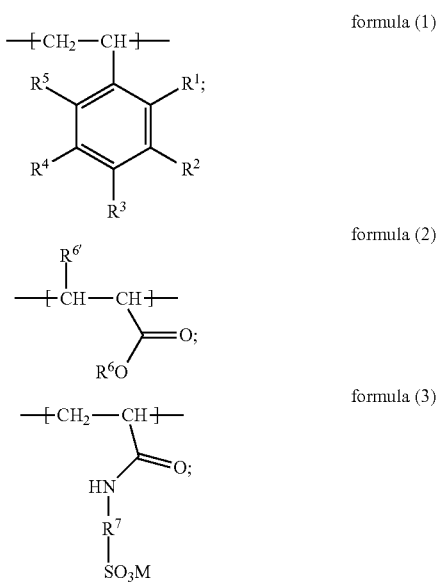

wherein, $R^1$, $R^2$, $R^3$, $R^4$, and $R^5$ independently are H, $C_1$-$C_4$ alkyl or $C_1$-$C_4$ alkoxyl; $R^6$ is $C_1$-$C_6$ alkyl; $R^{6'}$ is H or $C_1$-$C_4$ alkyl; $R^7$ is $C_1$-$C_{10}$ alkyl; M is H or an alkali metal; the molar ratio of the structural units denoted by formula (1):the structural units denoted by formula (2):the structural units denoted by formula (3) is 1:0.3-1.5:0.3-1; the weight-average molecular weight of the protecting agent is 60,000-70,000 g/mol.

According to the present subject matter, for middle permeability reservoirs, the reservoir permeability is usually 100~200 mD. In the drilling process, the reservoir may be subject to damages resulted from intrusion of solid particles, hydrated swelling and dispersed migration of clay minerals, and intrusion of filtrate from working fluid. In addition, it is difficult to recover from such damages. Wide attention has been drawn to the reservoir damages in the petroleum industries in China and foreign countries. In addition, as the exploration is developed further, that problem has become more prominent.

With consideration of the structural characteristics of middle permeability reservoirs, the present inventor has obtained the reservoir protecting agent composition disclosed in the present subject matter through research, and uses the reservoir protecting agent composition as a main protecting agent component in drilling fluids. Thus, when such drilling fluids are used in well drilling in middle permeability reservoirs, a favorable temporary plugging effect can be attained without consideration of strict matching with the pore throats in the middle permeability reservoirs, even in the cases that the pore size distribution is not known clearly or the pore size distribution is in a wide range in the middle permeability reservoirs. In addition, such drilling fluids are easier and more convenient to apply.

Wherein, the non-fluorescent sulfonated asphalt in the reservoir protecting agent composition can attach to the surface of reservoir rock and fill up pore throats and fractures to attain certain plugging effect; in addition, it can cover the rock surface and improve mud cake quality. The reservoir protecting agent used in the drilling fluid will concentrate into colloidal particles when it reaches specific concentration; thus, under the temperature and pressure conditions at the bottom of well, the protecting agent can attach, deform, and accumulate on the rock surface to form a dense film, and thereby prevent intrusion of the liquid phase and solid phase in the drilling fluid into the strata. In view that the film formation time of the reservoir protecting agent is slightly longer than the duration of plugging effect of the sulfonated asphalt, the sulfonated asphalt is used to form a plugging layer on the rock surface immediately in the case that the drilling fluid leaks off instantaneously when it encounters a reservoir in the drilling process, so as to leave enough time for the reservoir protecting agent to concentrate into colloidal particles and accomplish thereby further plugging and protection for the rock. The plugging and protection of reservoir accomplished in such a time-coordinated manner is specifically applicable to middle permeability reservoirs in which the permeability is neither too high nor too low.

There is no particular restriction on the non-fluorescent sulfonated asphalt in the present subject matter. In other words, the non-fluorescent sulfonated asphalt can be any conventional non-fluorescent sulfonated asphalt in the art, such as FT-1 from Zhengzhou Yuhua Auxiliaries Co., Ltd., FT-1 from Shandong Yanggu Jiangbei Chemicals Co., Ltd., and FT-1 from Shandong Dongying Guangyun Industry and Trade Co., Ltd.

To further improve the synergistic effect of the two components in the composition, in another embodiment, the weight ratio of the reservoir protecting agent to the non-fluorescent sulfonated asphalt is 100:50-100.

According to the present subject matter, the reservoir protecting agent can work with the filler to form a polymer film on the reservoir rock. The reservoir protecting agent is an amphiphilic polymer, which contains hydrophilic sulfonate groups and a large quantity of benzene rings and hydrophobic acrylate groups. When the amphiphilic polymer serving as the reservoir protecting agent is used with the non-fluorescent sulfonated asphalt together in the drilling fluid for well drilling, the strongly hydrophilic sulfonate groups will attach to the surface of the clay, so that the hydrated film on the surface of the clay is thickened, and thereby the diffused electric doublet layer on the surface of the clay is enhanced, and flocculation or agglomeration of the clay incurred by high temperature and high-salinity electrolytes can be effectively prevented. Hence, the protecting agent can endow the drilling fluid with outstanding temperature tolerance, salinity tolerance, and filter loss reduction properties. In addition, the hydrophilic sulfonate groups can attach to the surface of reservoir rock and overlying clay shale, while the hydrophobic groups extend outward from the rock surface; thus, a hydrophobic film can be formed on the rock surface. The hydrophobicity can inhibit the permeation of free water in the drilling fluid into the reservoir rock and clay shale. Thus, on one hand, the reservoir is protected against the damages from the drilling fluid; on the other hand, the hydrated expansion and dispersion of the clay shale can be inhibited.

According to the present subject matter, to obtain a polymer serving as a reservoir protecting agent for drilling fluid with higher performance, in another embodiment, in the structural units denoted by formula (1), (2), and (3), which constitute the protecting agent, $R^1$, $R^2$, $R^3$, $R^4$, and $R^5$ are H, $C_1$-$C_3$ alkyl or $C_1$-$C_3$ alkoxyl respectively and independently. In another embodiment, $R^1$, $R^2$, $R^3$, $R^4$, and $R^5$ are H, methyl, ethyl, methoxyl or ethyoxyl respectively and independently; in another embodiment, $R^1$, $R^2$, $R^3$, $R^4$, and $R^5$ are H, methyl or ethyl respectively and independently.

According to the present subject matter, $R^6$ preferably is $C_1$-$C_4$ alkyl, and more preferably is methyl, ethyl, n-propyl, iso-propyl, n-butyl, iso-butyl or tert-butyl.

According to the present subject matter, $R^{6'}$ preferably is H, methyl or ethyl, and more preferably is H or methyl.

According to the present subject matter, $R^7$ preferably is $C_2$-$C_{10}$ alkyl, more preferably is $C_2$-$C_8$ alkyl, further more preferably is $C_2$-$C_7$ alkyl, still further more preferably is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$— or —$CH_2$—$CHCH_3$—$CH_2$—, and particularly preferably is —$C(CH_3)_2$—$CF_2$—.

According to the present subject matter, M preferably is H, Na, K or Li, more preferably is H or Na.

In another embodiment of the present subject matter, in the structural units denoted by formula (1), (2), and (3), which constitute the amphiphilic polymer, $R^1$, $R^2$, $R^3$, $R^4$, and $R^5$ are H, $R^6$ is n-butyl, $R^{6'}$ is H, and $R^7$ is —$C(CH_3)_2$—$CH_2$—.

In another embodiment of the present subject matter, in the structural units denoted by formula (1), (2), and (3), which constitute the amphiphilic polymer, $R^1$, $R^2$, $R^4$, and $R^5$ are H, $R^3$ is methyl, $R^6$ is ethyl, $R^{6'}$ is H, and $R^7$ is —$C(CH_3)_2$—$CH_2$—.

In another embodiment of the present subject matter, in the structural units denoted by formula (1), (2), and (3), which constitute the amphiphilic polymer, $R^1$, $R^2$, $R^3$, $R^4$, and $R^5$ are H, $R^6$ is methyl, $R^{6'}$ is H, and $R^7$ is —$C(CH_3)_2$—$CH_2$—.

In another embodiment, the weight-average molecular weight of the reservoir protecting agent is 64,000-70,000 g/mol.

In another embodiment, the molecular weight distribution index Mw/Mn of the reservoir protecting agent is 1.1-1.3.

According to the present subject matter, to balance the effect of the hydrophobic end and the effect of the hydrophilic end in the reservoir protecting agent and enhance the cooperation between the protecting agent and the non-fluorescent sulfonated asphalt to attain the objective of reservoir plugging, in another embodiment, in the protecting agent, the molar ratio of the structural units denoted by formula (1):the structural units denoted by formula (2):the structural units denoted by formula (3) is 1:0.4-1:0.3-0.7.

According to the present subject matter, the reservoir protecting agent can be prepared through any conventional polymerization reaction, as long as the obtained reservoir protecting agent has the structure and composition characteristics required in the present subject matter. In another embodiment, the method for preparation of the reservoir protecting agent in the present subject matter comprises: with an initiator in presence, controlling a chemical compound represented formula (4), a chemical compound represented the formula (5), and a chemical compound represented formula (6) to contact with an emulsifying agent in water to obtain an emulsified mixture and have a polymerization reaction, at a molar ratio of the chemical compound represented formula (4):the chemical compound represented the formula (5):the chemical compound represented formula (6) equal to 1:0.3-1.5:0.3-1; the weight-average molecular weight of the polymer obtained through the polymerization reaction is 60,000-70,000 g/mol;

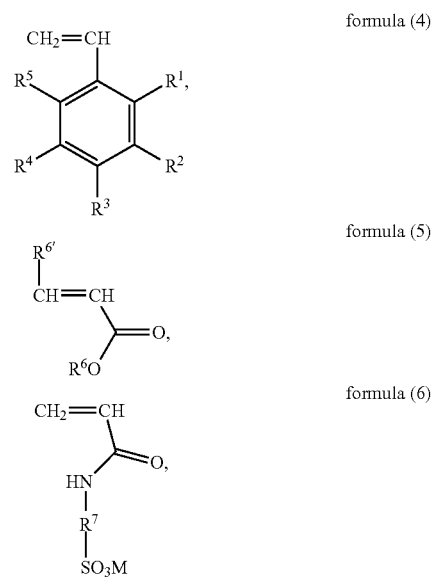

wherein, $R^1$, $R^2$, $R^3$, $R^4$, and $R^5$ independently are H, $C_1$-$C_4$ alkyl or $C_1$-$C_4$ alkoxyl; $R^6$ is $C_1$-$C_6$ alkyl; $R^{6'}$ is H or $C_1$-$C_4$ alkyl; $R^7$ is $C_1$-$C_{10}$ alkyl; M is H or an alkali metal.

Wherein, the structural units of the reservoir protecting agent depend on the chemical compound represented formula (4), the chemical compound represented formula (5), and the chemical compound represented formula (6); the chemical compound represented formula (4), the chemical compound represented formula (5), and the chemical compound represented formula (6) can be selected according to the desired structure of the reservoir protecting agent. Moreover, $R^1$, $R^2$, $R^3$, $R^4$, $R^5$, $R^6$, $R^{6'}$, $R^7$, and M are preferably selected within the scopes described above.

In another embodiment, the chemical compound represented formula (4) is one or more of styrene, p-methyl styrene, and p-ethyl styrene.

In another embodiment, the chemical compound represented formula (5) is one or more of methyl acrylate, ethyl acrylate, butyl acrylate, butyl methacrylate, and propyl methacrylate.

In another embodiment, the chemical compound represented formula (6) is one or more of 2-acrylamide-2-methyl propanesulfonic acid and 2-acrylamide propanesulfonic acid.

In another embodiment, the molar ratio of the chemical compound represented formula (4):the chemical compound represented formula (5):the chemical compound represented formula (6) is 1:0.4-1:0.3-0.7.

The polymerization reaction among the chemical compound represented formula (4), the chemical compound represented formula (5), and the chemical compound represented formula (6) is an emulsion polymerization reaction actually. Hence, an emulsifier must be added in the polymerization reaction. To enable the above monomers to have a reaction among them more uniformly and more completely, in the present subject matter, preferably the chemical compound represented formula (4), the chemical compound represented formula (5), and the chemical compound represented formula (6) are mixed with water to form a mixture, and then an emulsifier is added into the mixture to obtain an emulsified mixture.

Wherein, based on the total weight of the emulsified mixture, the total content of the chemical compound represented formula (4), the chemical compound represented formula (5), and the chemical compound represented formula (6) preferably is 55-65 wt. %. In another embodiment, the content of the chemical compound represented formula (4) is 20-28 wt. %. In another embodiment, the content of the chemical compound represented formula (5) is 10-16 wt. %. In another embodiment, the content of the chemical compound represented formula (6) is 15-28 wt. %.

There is no particular restriction on the emulsifier in the present subject matter, as long as the chemical compound represented formula (4), the chemical compound represented formula (5), and the chemical compound represented formula (6) are controlled to have an emulsion polymerization reaction with the method disclosed in the present subject matter and the protecting agent according to the present subject matter is obtained. In another embodiment, based on the total weight of the emulsified mixture, the concentration of the emulsifying agent is 4-5 wt. %. In another embodiment, the emulsifying agent is one or more of sodium dodecyl benzene sulfonate, sodium dodecyl sulfate, sodium diisopropyl naphthalene sulfonate, alkylphenol polyoxyethylene ether, and tributylphenol polyoxyethylene ether.

The concentration of the initiator can vary in a wide range, as long as the reservoir protecting agent disclosed in the present subject matter can be obtained. In another embodiment, based on the total weight of the emulsified mixture, the concentration of the initiator is 0.4-0.55 wt. %. In another embodiment, the initiator is one or more of azodiisobutyronitrile, dilauroyl peroxide, potassium persulfate, ammonium persulfate, benzoyl peroxide, and hydrogen peroxide.

In view of the high activity of the initiator, in the present subject matter, an inactive gas can be fed into the reaction system to expel oxygen in the reaction system and thereby keep the polymerization reaction in inert atmosphere before the polymerization reaction, wherein, the inactive gas is a gas that will not participate in the polymerization reaction and can expel oxygen, such as nitrogen, helium, or neon, etc. The inactive gas can be fed for 25-50 min., for example.

Likewise, to control the reaction rate of the polymerization reaction, preferably the emulsified mixture is heated up to 60-70° C. before the inactive gas is fed; then, the initiator can be added, and the polymerization reaction can be started.

According to another embodiment of the present subject matter, the conditions of the polymerization reaction include: 70-85° C. reaction temperature and 4-5.8 h reaction time.

Through a polymerization reaction under such conditions, a reservoir protecting agent that is especially suitable for the composition in the present subject matter can be obtained.

The reservoir protecting agent according to the present subject matter can be obtained after the polymerization reaction. To extract the reservoir protecting agent, the resultant mixed solution can be cooled after the polymerization reaction is completed, and the pH of the resultant mixed solution can be adjusted to 8.5-10 with 20-30 wt. % water solution of an alkali metal hydroxide (e.g., water solution of sodium hydroxide, or water solution of potassium hydroxide, etc.) to obtain a precipitate; then, the precipitate can be separated from the mixed solution and dried at 95-105° C., so as to obtain a solid protecting agent, which can be used as the reservoir protecting agent for drilling fluid in the present subject matter.

The present subject matter further provides a drilling fluid for middle permeability reservoirs, which contains the reservoir protecting agent composition described above.

To give a better play to the reservoir plugging and protection effect of the reservoir protecting agent composition in the well drilling process in middle permeability reservoirs, in another embodiment, the content of the reservoir protecting agent composition is 2-3 wt. % in the drilling fluid.

There is no particular restriction on the drilling fluid system that contains the reservoir protecting agent composition in the present subject matter. In other words, the drilling fluid system can be any conventional drilling fluid system in the art, as long as the reservoir protecting agent composition according to the present subject matter is added into the conventional drilling fluid system. As such a conventional drilling fluid system, for example, the drilling fluid can be one or more of potassium chloride-polyol drilling fluid, silicone drilling fluid, and cationic drilling fluid. The potassium chloride-polyol drilling fluid can be any potassium chloride-polyol drilling fluid well known to those skilled in the art; for example, it can be one or more of potassium chloride-polyethylene glycol drilling fluid, potassium chloride-polypropylene glycol drilling fluid, potassium chloride-ethylene glycol/propylene glycol copolymer drilling fluid, potassium chloride-polyglycerol drilling fluid and potassium chloride-polyethylene glycol drilling fluid. The silicone drilling fluid can be any silicone drilling fluid well known to those skilled in the art, and the silicone in the silicone drilling fluid can be selected from one or more of sodium methylsiliconate, potassium methylsiliconate, and silicone-potassium humate. The cationic drilling fluid can be any cationic drilling fluid well known to those skilled in the art; for example, the cations in the cationic drilling fluid can be selected from one or more of 2,3-epoxypropyl trimethyl ammonium chloride, 3-chloro-2-hydroxypropyl trimethyl ammonium chloride, and cationic polyacrylamide.

In another embodiment, the drilling fluid according to the present subject matter further contains one or more of bentonite, sodium carbonate, alkali metal hydroxide, inhibitor, temperature-tolerant filtrate reducer, filtrate reducer, temperature-tolerant inhibitor, and flocculant.

Wherein, the bentonite refers to clay which contains montmorillonite as the main mineral component and can endow the drilling fluid with viscous shearing force and filtration and wall building properties. For example, the bentonite can be sodium bentonite and/or calcium bentonite, preferably sodium bentonite. In another embodiment, the content of the bentonite is 2-4 wt. %, more preferably 2-3 wt. %.

Wherein, the inhibitor has an effect of inhibiting hydrated expansion of clay minerals in rock. For example, the inhibitor can be one or more of polyamine (CFY-01), potassium polyacrylate, and potassium-ammonium hydrolyzed polyacrylonitrile. In another embodiment, the content of the inhibitor is 3-4 wt. %.

Wherein, the temperature-tolerant filtrate reducer has an effect of reducing filter loss in drilling fluid and is temperature tolerant. For example, the temperature-tolerant filtrate reducer can be one or more of humic acid resin and polyanionic cellulose. In another embodiment, the content of the temperature-tolerant filtrate reducer is 2-3 wt. %.

Wherein, the filtrate reducer has an effect of reducing filter loss in drilling fluid. For example, the filtrate reducer can be one or more of polyethylene glycol, low-viscosity polyanionic cellulose, hydroxypropyl starch, and compound cellulose. In another embodiment, the content of the filtrate reducer is 5-8 wt. %.

Wherein, the temperature-tolerant inhibitor has an effect of inhibiting hydrated expansion of clay minerals in rock. For example, the temperature-tolerant inhibitor can be one or more of sulfonated phenolic resin and sulfomethylated phenolic resin. In another embodiment, the content of the temperature-tolerant inhibitor is 3-7 wt. %.

Wherein, the flocculant is mainly used to neutralize some electronegative or electropositive particles or grains that are difficult to separate in water with electropositive or electronegative groups to decrease the electric potential of the particle or grains and keep them in a stable state, and utilize its aggregation property to concentrate the particles or grains, so that the particles or grains can be separated physically or chemically. For example, the flocculant can be one or more of polyacrylamide and sodium polyacrylate. In another embodiment, the content of the flocculant is 0.2-3 wt. %.

The above additives can be commercially available products, or can be prepared with conventional methods in the art. They will not be further detailed hereunder.

In the drilling fluid according to another embodiment of the present subject matter, the content of NaCl is 3-4 wt. %. In another embodiment, the content of sodium carbonate is 0.1-0.3 wt. %. In another embodiment, the content of the alkali metal hydroxide is 0.3-0.5 wt. % (as a component of the drilling fluid, the alkali metal hydroxide can improve the mud-making performance of the bentonite, and can be one or more of sodium hydroxide, potassium hydroxide, and lithium hydroxide, and preferably is sodium hydroxide).

In another embodiment of the present subject matter, a drilling fluid is provided, which contains 2-3 wt. % reservoir protecting agent composition, 2-3 wt. % bentonite, 3-4 wt. % polyamine inhibitor, 2-3 wt. % sulfomethylated phenolic resin, 5-8 wt. % polyethylene glycol, 3-4 wt. % NaCl, 0.1-0.3 wt. % sodium carbonate, 0.3-0.5 wt. % NaOH, 3-4 wt. % sulfonated phenolic resin, 0.5-1 wt. % low-viscosity polyanionic cellulose, and 0.2-0.5 wt. % polyacrylamide.

The present subject matter further provides an application of the drilling fluid for middle permeability reservoirs in well drilling in middle permeability reservoirs.

When the drilling fluid is used in well drilling in middle permeability reservoirs, the synergistic effect of the two components in the reservoir protecting agent composition can exert effectively, so that the reservoir is protected effectively. The drilling fluid is especially favorable for protection of middle permeability reservoirs with 70-200 mD permeability.

The drilling fluid system provided in the present subject matter not only can effectively protect oil and gas reservoirs but also have advantages including easy use and easy field operation. It is simple to use, has high plugging performance, high inhibition performance, high environmental protection performance, and superior reservoir protection performance, and can greatly reduce reservoir damages from the drilling fluid and significantly reduce the cost of drilling fluid and completion fluid.

Hereunder the present subject matter will be further detailed in some embodiments.

In the following examples, the weight-average molecular weight is measured with a gel permeation chromatograph (GPC) (GPC Model E2695 from Waters Company (a USA company)); the molecular weight distribution index is the ratio of the weight-average molecular weight to the number-average molecular weight measured with the GPC.

Preparation Example 1

Add styrene (62 g, 0.59 mol), butyl acrylate (35.6 g, 0.28 mol) and 2-acrylamide-2-methyl propanesulfonic acid (42.1 g, 0.2 mol) into 100 mL water to form a primary mixture, add 5.9 g sodium dodecyl benzene sulfonate (from Chengdu Micxy Chemicals Co., Ltd.) to obtain an emulsified mixture, feed nitrogen for 30 min. into the emulsified mixture, heat up the emulsified mixture to 70° C. and add 0.6 g ammonium persulfate into it, and then further heat up the emulsified mixture to 75° C. and keep it at the temperature for reaction for 5 h; after the reaction is completed, cool down the reaction solution to 30° C., add 20 wt. % water solution of sodium hydroxide to adjust the pH to 8.5, and then add 10 mL methyl alcohol and stir to obtain a precipitate; dry the obtained precipitate at 100° C. and grind it into powder; thus, 131 g solid protecting agent A1 (yellowish powder) in 0.7-0.8 μm particle diameter is obtained, which is the protecting agent described in the present subject matter. The weight-average molecular weight of the protecting agent is 67,521 g/mol, and the molecular weight distribution coefficient is 1.3; analyzed by H-NMR spectroscopy and C-NMR spectroscopy, the polymer contains structural units denoted by formula (1), structural units denoted by formula (2), and structural units denoted by formula (3) at 1:0.47:0.34 molar ratio.

Preparation Example 2

Add p-methyl styrene (52 g, 0.44 mol), ethyl acrylate (25.6 g, 0.26 mol) and 2-acrylamide-2-methyl propanesulfonic acid (62.1 g, 0.3 mol) into 100 mL water to form a primary mixture, add 6.7 g sodium dodecyl sulfate (from Zibo Jujin Chemicals Co., Ltd.) to obtain an emulsified mixture, feed nitrogen for 30 min. into the emulsified mixture, heat up the emulsified mixture to 75° C. and add 0.7 g azodiisobutyronitrile into it, and then further heat up the emulsified mixture to 85° C. and keep it at the temperature for reaction for 4.5 h; after the reaction is completed, cool down the reaction solution to 30° C., add 30 wt. % water solution of sodium hydroxide to adjust the pH to 9.5, and then add 10 mL methyl alcohol and stir to obtain a precipitate; dry the obtained precipitate at 100° C. and grind it into powder; thus, 145 g solid protecting agent A2 (yellowish powder) in 0.7-0.8 μm particle diameter is obtained, which is the protecting agent described in the present subject matter. The weight-average molecular weight of the protecting agent is 64,582 g/mol, and the molecular weight distribution coefficient is 1.3; analyzed by H-NMR spectroscopy and C-NMR spectroscopy, the polymer contains structural units denoted by formula (1), structural units denoted by formula (2), and structural units denoted by formula (3) at 1:0.59:0.68 molar ratio.

Preparation Example 3

Add styrene (52 g, 0.5 mol), methyl acrylate (38.4 g, 0.45 mol) and 2-acrylamide-2-methyl propanesulfonic acid (62.1 g, 0.3 mol) into 100 mL water to form a primary mixture, add 6.5 g sodium diisopropyl naphthalene sulfonate (from Sichuan Cloud Bird Technology Development Co., Ltd., the same below) to obtain an emulsified mixture, feed nitrogen for 40 min. into the emulsified mixture, heat up the emulsified mixture to 70° C. and add 0.8 g dilauroyl peroxide into it, and then further heat up the emulsified mixture to 75° C. and keep it at the temperature for reaction for 5.5 h; after the reaction is completed, cool down the reaction solution to 35° C., add 25 wt. % water solution of sodium hydroxide to adjust the pH to 9, and then add 10 mL methyl alcohol and stir to obtain a precipitate; dry the obtained precipitate at 100° C. and grind it into powder; thus, 142 g solid protecting agent A3 (yellowish powder) in 0.6-0.75 μm particle diameter is obtained, which is the protecting agent described in the present subject matter. The weight-average molecular weight of the protecting agent is 68,427 g/mol, and the molecular weight distribution coefficient is 1.2; analyzed by H-NMR spectroscopy and C-NMR spectroscopy, the polymer contains structural units denoted by formula (1), structural units denoted by formula (2), and structural units denoted by formula (3) at 1:0.9:0.6 molar ratio.

Comparative Preparation Example 1

Add styrene (31.2 g, 0.3 mol), butyl acrylate (25.6 g, 0.2 mol) and 2-acrylamide-2-methyl propanesulfonic acid (31 g, 0.15 mol) into 100 mL water to form a primary mixture, add 3 g sodium dodecyl benzene sulfonate to obtain an emulsified mixture, feed nitrogen for 30 min. into the emulsified mixture, heat up the emulsified mixture to 65° C. and add 0.3 g ammonium persulfate into it, and then further heat up the emulsified mixture to 70° C. and keep it at the temperature for reaction for 4 h; after the reaction is completed, cool down the reaction solution to 40° C., add 20 wt. % water solution of sodium hydroxide to adjust the pH to 9, and then add 5 mL methyl alcohol and stir to obtain a precipitate; dry the obtained precipitate at 100° C. and grind it into powder; thus, 77 g solid protecting agent B1 (yellowish powder) is obtained, which is the protecting agent described in the present subject matter. The weight-average molecular weight of the protecting agent is 55,346 g/mol, and the molecular weight distribution coefficient is 1.3; analyzed by H-NMR spectroscopy and C-NMR spectroscopy, the polymer contains structural units denoted by formula (7), structural units denoted by formula (8), and structural units denoted by formula (9) at 1:0.67:0.5 molar ratio.

Comparative Preparation Example 2

Add styrene (52 g, 0.5 mol), methyl acrylate (51.2 g, 0.6 mol) and 2-acrylamide-2-methyl propanesulfonic acid (41.4 g, 0.2 mol) into 100 mL water to form a primary mixture, add 7.5 g sodium diisopropyl naphthalene sulfonate to obtain an emulsified mixture, feed nitrogen for 40 min. into the emulsified mixture, heat up the emulsified mixture to 65° C. and add 1.5 g dilauroyl peroxide into it, and then further heat up the emulsified mixture to 70° C. and keep it at the temperature for reaction for 6.5 h; after the reaction is completed, cool down the reaction solution to 40° C., add 25 wt. % water solution of sodium hydroxide to adjust the pH to 9, and then add 3.5 mL methyl alcohol and stir to obtain a precipitate; dry the obtained precipitate at 100° C. and grind it into powder; thus, 121 g solid protecting agent B2 (yellowish powder) in 0.6-0.7 μm particle diameter is obtained, which is the protecting agent described in the present subject matter. The weight-average molecular weight of the protecting agent is 75,347 g/mol, and the molecular weight distribution coefficient is 1.3; analyzed by H-NMR spectroscopy and C-NMR spectroscopy, the polymer contains structural units denoted by formula (1), structural units denoted by formula (2), and structural units denoted by formula (3) at 1:1.2:0.4 molar ratio.

Examples 1-3

This example is provided here to describe the reservoir protecting agent composition and drilling fluid according to the present subject matter.

Prepare drilling fluids Y1-Y3 with the following formulation: 3 wt. % protecting agent composition (see Table 1 for the composition), 2 wt. % sodium bentonite (from Zhengzhou Huajing Chemicals Co., Ltd.), 3.5 wt. % polyamine inhibitor (from Zhengzhou Huajing Chemicals Co., Ltd.), 2.5 wt. % sulfomethylated phenolic resin (from Zhengzhou Huajing Chemicals Co., Ltd.), 5.5 wt. % polyethylene glycol (PEG from Zhengzhou Huajing Chemicals Co., Ltd., the same below), 4 wt. % sulfonated phenolic resin (from Zhengzhou Huajing Chemicals Co., Ltd.), 1 wt. % low-polyanionic cellulose polyanionic cellulose (from Zhengzhou Huajing Chemicals Co., Ltd.), 0.2 wt. % polyacrylamide (from Zhengzhou Huajing Chemicals Co., Ltd.), 0.8 wt. % NaCl, 0.3 wt. % $Na_2CO_3$, 0.2 wt. % NaOH, and water (the rest content).

Example 4

This example is provided here to describe the reservoir protecting agent composition and drilling fluid according to the present subject matter.

Prepare drilling fluid Y4 with the following formulation: 2 wt. % protecting agent composition (see Table 1 for the composition), 3 wt. % bentonite, 0.2 wt. % $Na_2CO_3$, 0.2 wt. % NaOH, 0.5 wt. % sulfomethylated phenolic resin, 6 wt. % KCl, 2.5 wt. % hydroxypropyl starch (from Yanggu Longquan Chemicals Co., Ltd.), 3 wt. % sodium polyacrylate (from Yanggu Longquan Chemicals Co., Ltd.), 0.6 wt. % polyanionic cellulose, and 2 wt. % polyethylene glycol.

Comparative Example 1

Prepare with the method described in example 1, but without adding the reservoir protecting agent composition, to obtain a drilling fluid DY1.

Comparative Example 2

Prepare with the method described in embodiment 1, but the protecting agent composite doesn't contain non-fluorescent sulfonated asphalt (see Table 1 for the composition), to obtain a drilling fluid DY2.

Comparative Example 3

Prepare with the method described in example 1, but the protecting agent composition doesn't contain a reservoir protecting agent (see Table 1 for the composition), to obtain a drilling fluid DY3.

Comparative Example 4

Prepare with the method described in example 1, but the composition of the reservoir protecting agent composition is that shown in Table 1, to obtain a drilling fluid DY4.

Comparative Example 5

Prepare with the method described in example 1, but the composition of the reservoir protecting agent composition is that shown in Table 1, to obtain a drilling fluid DY5.

TABLE 1

| Example | Reservoir Protecting agent | Non-Fluorescent Sulfonated Asphalt Manufacturer | Weight Ratio of Sulfonated Asphalt to Protecting agent |
|---|---|---|---|
| Example 1 | A1 | Zhengzhou Yuhua Auxiliaries Co., Ltd./FT-1 | 50: 100 |
| Example 2 | A2 | Shangdong Yanggu Jiangbei Chemicals Co., Ltd./FT-1 | 50: 100 |
| Example 3 | A3 | Shandong Dongying Guanyun Industry and Trade Co., Ltd./FT-1 | 100: 100 |
| Example 4 | A1 | Zhengzhou Yuhua Auxiliaries Co., Ltd./FT-1 | 100: 100 |
| Comparative example 1 | / | / | / |
| Comparative example 2 | A1 | / | 0: 100 |
| Comparative example 3 | / | The same as example 1 | 100: 0 |
| Comparative example 4 | B1 | The same as example 1 | The same as example 1 |
| Comparative example 5 | B2 | The same as example 1 | The same as example 1 |

Test Example 1

Rheology property test: take 400 mL drilling fluids Y1-Y4 and DY1-DY5 respectively, stir for 5 min. at a low speed, and then measure the apparent viscosity (AV, mPa·s), plastic viscosity (PV, mPa·s), dynamic shearing force (YP, Pa), 10 s and 10 min. static shearing force, and API water loss under moderate pressure (API, FL, mL) of the drilling fluids respectively as per GB/T16783.1-2006. The results are shown in Table 2.

TABLE 2

| Drilling Fluid | AV (mPa·s) | PV (mPa·s) | YP (Pa) | 10 s/10 min (Pa/Pa) | API·FL (mL) |
|---|---|---|---|---|---|
| Y1 | 85 | 47 | 43 | 6.5/8.0 | 0.2 |
| Y2 | 81 | 45 | 41 | 5.5/6.5 | 0.4 |
| Y3 | 83 | 49 | 39 | 5.0/7.0 | 0.4 |
| Y4 | 82 | 43 | 38 | 5.5/7.5 | 0.5 |
| DY1 | 88 | 45 | 39 | 7.5/8.5 | 4.8 |
| DY2 | 81 | 41 | 35 | 6.0/8.0 | 1.9 |
| DY3 | 79 | 39 | 37 | 5.5/7.5 | 2.3 |
| DY4 | 76 | 43 | 39 | 5.0/7.5 | 1.6 |
| DY5 | 83 | 44 | 41 | 5.5/6.5 | 1.5 |

It can been seen in Table 2: when the reservoir protecting agent composition according to the present subject matter is used in the drilling fluid, the API filter loss can be reduced to 0.2-0.5 mL. When the reservoir protecting agent composition is not used, the filter loss is maximum, as high as 4.8 ml; when the reservoir protecting agent or the non-fluorescent sulfonated asphalt is used merely, the filter loss is high, and is 1.9 mL and 2.3 mL respectively; when the protecting agent B1 or B2 is used in combination with the non-fluorescent sulfonated asphalt, the filter loss is also high, i.e., 1.5-1.6 mL.

Test Example 2

Temperature tolerance test: take 400 mL drilling fluids Y1-Y4 and DY1-DY5 respectively, stir for 20 min. at a high speed, load the drilling fluids into aging cans and then load the aging cans into a roller furnace and roll for 16 h at 150° C. temperature; then, take out the aging cans and cool down them to room temperature (about 20° C.), stir for 5 min. at a high speed, and then measure the apparent viscosity (AV, mPa·s), plastic viscosity (PV, mPa·s), dynamic shearing force (YP, Pa), 10 s and 10 min. static shearing force, API water loss under moderate pressure (API, FL, mL), and water loss under high temperature and high pressure (HTHP, FL, mL) of the drilling fluids respectively as per GB/T16783.1-2006. The results are shown in Table 3.

TABLE 3

| Drilling Fluid | AV (mPa·s) | PV (mPa·s) | YP (Pa) | 10 s/10 min (Pa/Pa) | API·FL (mL) | HTHP·FL (mL) |
|---|---|---|---|---|---|---|
| Y1 | 83 | 39 | 46 | 6.0/8.5 | 0.5 | 1.5 |
| Y2 | 82 | 38 | 47 | 5.5/6.5 | 0.5 | 1.7 |
| Y3 | 81 | 37 | 48 | 5/7 | 0.3 | 1.7 |
| Y4 | 79 | 41 | 45 | 6.5/7 | 0.3 | 1.8 |
| DY1 | 79 | 41 | 42 | 5.5/8 | 5.2 | 12.1 |
| DY2 | 78 | 39 | 42 | 4.5/6 | 2.2 | 5.7 |
| DY3 | 80 | 40 | 39 | 5/6.5 | 2.3 | 5.8 |
| DY4 | 79 | 41 | 41 | 5.5/7.5 | 1.4 | 2.9 |
| DY5 | 82 | 42 | 38 | 5/7 | 1.5 | 2.1 |

It can been seen in Table 3: when the reservoir protecting agent composition according to the present subject matter is used in the drilling fluid, the API filter loss can be reduced to 0.3-0.5 mL, and the HTHP filter loss can be reduced to 1.5-1.8 mL. When the reservoir protecting agent composition is not used, the API filter loss is maximum, as high as 5.2 ml, and the HTHP filter loss is 12.1 mL; when the reservoir protecting agent or the non-fluorescent sulfonated asphalt is used separately and merely, the API filter loss is high, and is 2.2 mL and 2.3 mL respectively, and the HTHP filter loss is 5.7 mL and 5.8 mL respectively; when the protecting agent B1 or B2 is used in combination with the non-fluorescent sulfonated asphalt, the API filter loss is 1.4 mL and 1.5 mL, and the HTHP filter loss is 2.9 mL and 2.1 mL, respectively.

Test Example 3

Assessment of recovery rate of clay shale: add 350 mL drilling fluids Y1-Y4 and DY1-DY5 and 50 g dry drill cuttings (6-10 mpi drill cuttings dried at 150° C.) into aging cans respectively, and carry out aging at 120° C. for 16 h; filter the mixtures after aging through a 40 mpi sieve and flush with tap water respectively; dry the drill cuttings after flushing at 105° C., weigh, and calculate the recovery rate of clay shale=weight of dried drill cuttings/initial weight of drill cuttings×100%.

Assessment of linear expansion of clay shale: take rock powder obtained through drying and grinding, and prepare the rock powder into core blocks (press for 5 min. at 4 MPa pressure) for assessment; start a M4600 linear expansion tester for clay shale, mount the core blocks in the tester, make zero adjustment, and then pour the drilling fluids Y1-Y4 and DY1-DY5 respectively; start the test, and record the linear expansion (mm) once every 0.5 h; compare with a reference solution (distilled water), and calculate the linear expansion reduction rate=(measured height−initial height)/initial height×100%. The results are shown in Table 4.

TABLE 4

| Drilling Fluid | Rolling Recovery Rate of Clay Shale (%) | Linear Expansion Reduction Rate of Clay Shale (%) | | | |
|---|---|---|---|---|---|
| | | 2 h | 4 h | 6 h | 8 h |
| Y1 | 92.1 | 87.1 | 83.4 | 81.2 | 80.1 |
| Y2 | 90.2 | 88.1 | 86.4 | 84.2 | 80.3 |
| Y3 | 91.1 | 86.4 | 84.2 | 82.1 | 80.2 |
| Y4 | 90.2 | 88.2 | 86.2 | 85.4 | 83.2 |
| DY1 | 90.1 | 86.3 | 82.3 | 79.2 | 75.3 |
| DY2 | 89.5 | 86.4 | 84.2 | 78.8 | 76.3 |
| DY3 | 88.3 | 88.6 | 86.4 | 80.2 | 79.7 |
| DY4 | 89.7 | 88.2 | 86.1 | 81.4 | 80.5 |
| DY5 | 88.7 | 86.2 | 84.5 | 80.5 | 79.4 |

It can be seen in Table 4: the drilling fluid system has high inhibition capability, wherein, among Y1-Y4, the rolling recovery rate of clay shale is 90% or above, and the 8 h linear expansion reduction rate of clay shale is 80% or above. Thus, the drilling fluid system can meet the requirements in actual drilling.

Test Case 4

Test the reservoir protection performance of the drilling fluids Y1-Y4 and DY1-DY5 in a JHMD-1 HTHP dynamic filter loss tester as per SYT6540-2002 "Method for Lab Assessment of Drilling and Completion Fluids Damaging Oil Formation". The results are shown in Table 5;

Wherein, the original permeability of the rock core used in the test is the initial value shown in Table 5.

TABLE 5

| Drilling Fluid | Rock Core No. | Permeability to Oil/$10^{-3}$ μm² | | Recovery Rate of Permeability/% | |
|---|---|---|---|---|---|
| | | Initial Value | After Plugging | Plugging Rate/% | After Damage | After End Face Cutting |
| Y1 | 1 | 95.3 | 3.05 | 96.8 | 96.1 | 98.0 |
| Y2 | 2 | 112.3 | 6.51 | 94.2 | 95.2 | 97.8 |
| Y3 | 3 | 96.1 | 6.53 | 93.2 | 95.3 | 98.1 |
| Y4 | 4 | 75.4 | 0.9 | 98.8 | 98.1 | 99.2 |
| DY1 | 5 | 75.6 | 16.48 | 78.2 | 81.1 | 83.4 |
| DY2 | 6 | 83.2 | 13.06 | 84.3 | 85.4 | 89.4 |
| DY3 | 7 | 94.1 | 12.04 | 87.2 | 86.2 | 89.7 |
| DY4 | 8 | 142.5 | 15.39 | 89.2 | 90.2 | 90.5 |
| DY5 | 9 | 123.8 | 11.76 | 90.5 | 89.5 | 92.3 |

It is seen in Table 5: when the reservoir protecting agent composition according to the present subject matter is used in a drilling fluid, a good reservoir plugging effect and high permeability recovery capability can be obtained. For example, the plugging rate can be 93% or above, and the permeability recovery rate can be 95% or above.

In summary, it can be seen from above data: the protecting agent composition disclosed in the present subject matter has an apparent protective effect and can attain an ideal reservoir protection effect when it is used in middle permeability reservoirs. Thus, when the protecting agent composition is used in a drilling fluid, an ideal reservoir protection effect can be obtained.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

What is claimed is:

1. A reservoir protecting agent composition consisting of a non-fluorescent sulfonated asphalt and a reservoir protecting agent, wherein the reservoir protecting agent is composed of structural units denoted by formula (1), formula (2), and formula (3):

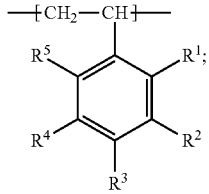

formula (1)

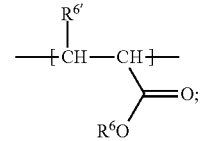

formula (2)

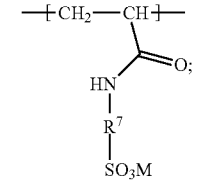

formula (3)

wherein $R^1$, $R^2$, $R^3$, $R^4$, and $R^5$ independently are H, $C_1$-$C_4$ alkyl or $C_1$-$C_4$ alkoxyl; $R^6$ is $C_1$-$C_6$ alkyl; $R^{6'}$ is H or $C_1$-$C_4$ alkyl; $R^7$ is $C_1$-$C_{10}$ alkyl; M is H or an alkali metal; a molar ratio of the structural units denoted by formula (1): the structural units denoted by formula (2): the structural units denoted by formula (3) is 1:0.3-1.5:0.3-1; a weight-average molecular weight of the protecting agent is 60,000-70,000 g/mol.

2. The reservoir protecting agent composition according to claim 1 wherein a weight ratio of the reservoir protecting agent:the non-fluorescent sulfonated asphalt is 100:100 to 100:50.

3. The reservoir protecting agent composition according to claim 1 wherein $R^1$, $R^2$, $R^3$, $R^4$, and $R^5$ independently are H, methyl, ethyl, methoxyl, or ethyoxyl.

4. The reservoir protecting agent composition according to claim 1 wherein $R^6$ is methyl, ethyl, n-propyl, iso-propyl, n-butyl, iso-butyl, or tert-butyl.

5. The reservoir protecting agent composition according to claim 3 wherein $R^6$ is methyl, ethyl, n-propyl, iso-propyl, n-butyl, iso-butyl, or tert-butyl.

6. The reservoir protecting agent composition according to claim 4 wherein $R^{6'}$ is H, methyl, or ethyl.

7. The reservoir protecting agent composition according to claim 5 wherein $R^{6'}$ is H, methyl, or ethyl.

8. The reservoir protecting agent composition according to claim 5 wherein $R^7$ is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$—, or —$CH_2$—$CHCH_3$—$CH_2$—.

9. The reservoir protecting agent composition according to claim 7 wherein $R^7$ is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$—, or —$CH_2$—$CHCH_3$—$CH_2$—.

10. The reservoir protecting agent composition according to claim 9 wherein M is H, Na, K, or Li.

11. The reservoir protecting agent composition according to claim 1 wherein the weight-average molecular weight of the reservoir protecting agent is 64,000-70,000 g/mol.

12. The reservoir protecting agent composition according to claim 1 wherein the molar ratio of the structural units denoted by formula (1):the structural units denoted by formula (2):the structural units denoted by formula (3) is 1:0.4-1:0.3-0.7.

13. The reservoir protecting agent composition according to claim 1 wherein a molecular weight distribution index of the reservoir protecting agent is 1.1-1.3.

\* \* \* \* \*